United States Patent [19]

Matsuda et al.

[11] Patent Number: 4,961,178
[45] Date of Patent: Oct. 2, 1990

[54] METHOD OF ERASABLE RECORDING AND READING OF INFORMATION

[75] Inventors: Shunsuke Matsuda, Osaka; Yasuhiro Hioki, Hirakata; Masaaki Ueda, Suita, all of Japan

[73] Assignee: Matsushita Electric Industrial Co., Ltd., Osaka, Japan

[21] Appl. No.: 110,853

[22] Filed: Oct. 21, 1987

[30] Foreign Application Priority Data

Oct. 21, 1986 [JP] Japan .................... 61-249980/1986
Mar. 18, 1987 [JP] Japan .................... 62-62924/1987

[51] Int. Cl.$^5$ ................................. G11B 7/00
[52] U.S. Cl. ........................ 369/103; 369/101
[58] Field of Search ....................... 369/101, 103

[56] References Cited

U.S. PATENT DOCUMENTS 4,088,895  5/1978  Martin ............................ 250/492
4,090,253  5/1978  Salgo ............................. 369/101
4,130,891 12/1978  Kirkpatrick et al. ............. 365/105

FOREIGN PATENT DOCUMENTS 0222453 12/1983 Japan ..................... 369/101

Primary Examiner—William L. Sikes
Assistant Examiner—Robert E. Wise
Attorney, Agent, or Firm—Wenderoth, Lind & Ponack

[57] ABSTRACT

This invention relates to a method of writing, erasing, and reading of a large volume, high-density information. The writing is accomplished by ionizing an element different from a substrate element, and scanning the substrate by a focused ion beam of the ionized element for depositing the atoms of the ionized element on or implanting them into the surface layer of the substrate in accordance with an information signal. The erasing is done by sputtering to scatter the written element existing on the substrate with a focused ion beam of another element. The reading is accomplished by scanning the substrate with a focused electron beam, and detecting a difference in the intensity of energy spectrum of the scattering electrons, secondary electrons and Auger electrons emitted by the element of the substrate and the written element.

15 Claims, 5 Drawing Sheets

METHOD OF ERASABLE RECORDING AND READING OF INFORMATION

BACKGROUND OF THE INVENTION

1. Field of the Invention

This invention relates to a method of recording information at high density and a method of reading the recorded information.

2. Description of the Prior Art

Known conventional methods of high density recording of information are the magnetic recording causing a difference in magnetization with a magnetic head, the magneto-optical recording causing a difference in magnetization with an optical head and the method causing a chemical change or physical shape change through photochemical or opto-thermal action.

The recording density obtained through these techniques is univocally limited by the size of the recording head. Namely, the gap area of the smallest magnetic head produced under the existing technology is 3.5 $\mu m^2$ (the track pitch is 10 $\mu m$ and the gap width is 0.35 $\mu m$). On the other hand, for the optical head, the spot diameter d of a light beam is expressed as:

$$d \approx 1.2 \frac{\lambda}{NA}$$

where $\lambda$ is the wave length of the light beam and NA is the numerical aperture of a lens in the head. Therefore, if the NA of a frequently-used lens is 0.5 and the wave length $\lambda$ is 0.8 $\mu m$, then the spot diameter becomes $d \approx 1.6$ $\mu m$ (the spot area is 2 $\mu m^2$). With these heads, the two-dimensional recording density becomes $10^8$ bits/$cm^2$:

In order to achieve a still higher density storage of information, a memory device which utilizes ion beams for writing and reading is known (F. W. Martin, U.S. Pat. No. 4,088,895). This device stores information on an extremely small scale by change of the physical condition of a substrate when the substrate is irradiated by ion beam. When the beam irradiates, a memory site is formed which corresponds to a binary "1" bit, while the absence of such a site corresponds to a binary "0". Information is stored in an array of such sites, for example in a rectangular array in which each site is addressed by the horizontal and vertical distances from a fiducial starting point on the substrate surface. The presence or absence of irradiation on a site is determined by ion beam. The ions interact differently with the site where the ion beam struck. The current of the ion beam utilized is 10 to 1,000 picoamperes while its beam diameter is smaller than 1 $\mu m$. When utilizing a 300 pA, 2,000 Å radius beam, it takes 10 $\mu sec$ to write one memory site. In reading, the same type of ion or another type of ion from another irradiation mechanism is irradiated, and ultraviolet light or X-ray photon generated thereby is detected.

Another known method utilizes a semiconducting diode as a substrate to read the current increase of the semiconducting diode resulting from ion implementation to its depletion region (C. G. Kirkpatrick, U.S. Pat. No. 4,130,891).

In the above-mentioned prior art, since the same phenomenon as that in writing occurs in reading, the clarity of written information, or the signal-to-noise ratio, will reduce by repetitive reading operations. Further, in both of the latter two methods, since the written information cannot be erased, they can be utilized only as a read only memory.

SUMMARY OF THE INVENTION

An object of this invention is to provide a method of recording erasable information at an extremely high recording density.

The writing method of the invention focuses an ion beam or a partially-ionized molecular beam of a specific element on a substrate containing elements different from the specific element so that the specific element is deposited on the substrate or implanted in the surface layer of the substrate. The presence and absence of the written specific element correspond to binary "1" and binary "0", respectively.

In order to erase the written information, an ion beam of an element different from the specific element for writing, is focused on a site to be erased so that the specific element at the site is sputtered.

In order to read the written information, a focused electron beam is used to scan the substrate, and Auger electrons emitted from the specific element are detected to determine the presence or absence of the specific element on each site.

Another method of reading the written information scans the substrate by using a focused electron beam and detects information based on a difference between the reflected electron beams, secondary electrons or X-rays from the substrate element and from the written element.

DESCRIPTION OF THE PREFERRED EMBODIMENTS

Figure 1A:
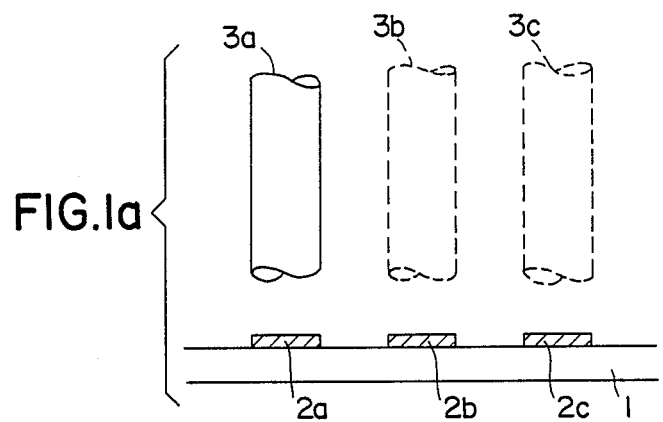
FIGS. 1 (a) and (b) depict the principles of writing and erasing of information memory by using a difference in elements according to this invention.
Figure 1B:
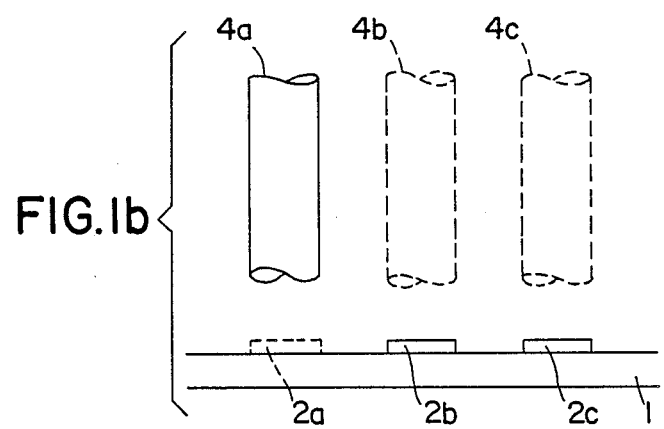

FIGS. 1 (a) and (b) illustrate principles of recording and erasing, respectively.

Referring to FIG. 1 (a), reference numeral 1 shows a substrate consisting of an element A, 2a, 2b and 2c show parts consisting of an element B deposited in accordance with an information signal, and 3a, 3b and 3c show ion beams consisting of the element B or element B ion for depositing onto the substrate 1 in accordance with the information signal.

The beams 3a, 3b and 3c may be either focused or patterned to be collectively recorded on multipoints. In the case of a focused ion beam, the position of the beam relative to the substrate is changed sequentially in the order of 3a, 3b and 3c so that the element B deposited parts 2a, 2b and 2c are produced on the substrate 1.

Figure 2A:
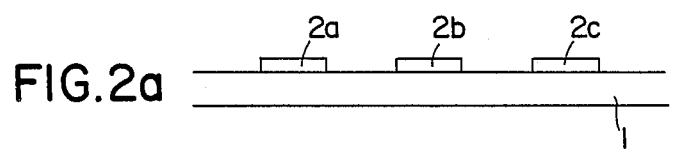
FIGS. 2 (a) and (b) depict substrates on which information is stored.
Figure 2B:
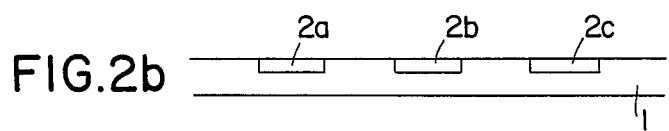

The recorded element may be deposited on the substrate 1 as shown in FIG. 2 (a) or implanted in the surface layer of the substrate 1 as shown in FIG. 2 (b). The selection of the states shown in FIGS. 2 (a) and (b) can be done by controlling the acceleration voltage of the ion beam and the ambient atmosphere.

Such a recorded state can be partially or completely erased. If, as shown in FIG. 1 (b), atom, molecule or ion beams 4a, 4b and 4c of any element different from element B are irradiated on the element B recorded parts 2a, 2b and 2c, the atoms of element B constituting the parts 2a, 2b and 2c are sputtered to scatter, causing the recorded information to be erased.

Figure 3:
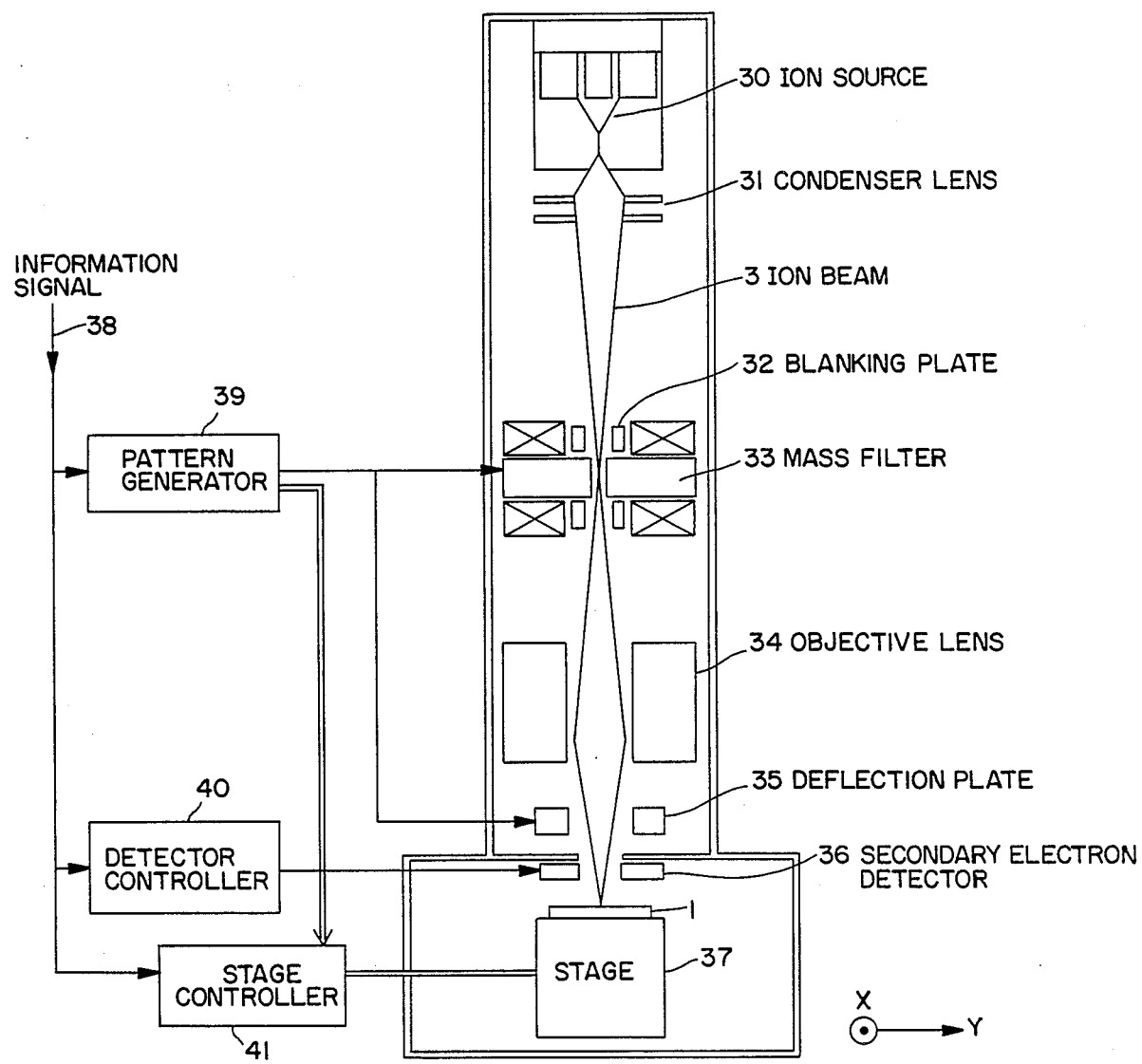
FIG. 3 depicts an apparatus for scanning the substrate with a focused ion beam.

In order to implement the above-described method, an apparatus as shown in FIG. 3 may be used. Ions emitted from an ion source 30 are focused by a condenser lens 31 to be a microscopic ion beam and blanked by an alignment deflecting system 32 if necessary. A mass filter 33 selects only the ion of element B. This element B ion beam is focused on the substrate 1 held on a stage 1 by an objective lens 34 and scans the surface of the substrate 1 by means of a deflecting system 35. In order to check the state of irradiation, a detector 36 is installed to detect secondary electrons which are produced from the irradiating ion beam.

The stage 1 may be either rotatable or movable in X and Y directions. When the stage 1 is rotatable, the ion beam may be deflected only in the radial direction. However, the deflection distance, is generally small such as 5 mm at the largest. Therefore, it is recommended that the rotating stage itself can be horizontally moved along the x-axis (1 axis). In the case of a X-Y movable stage, the substrate placed thereon is moved block by block in accordance with read-out X-Y coordinates, and the ion beam is deflected to scan each block.

In order to finely converge the irradiation ion or to enhance the accuracy of positioning, various kinds of additional units are possible. However, basically, a configuration such as shown in FIG. 3 may be adequate.

The erasing or scattering of the recorded element B can, as reading is done by checking the existence of element B, be achieved by irradiation of an ion of any element different from element B. In the case of utilizing a method not identified with element B, namely the irradiation damage method, it is recommended to utilize a beam of element A constituting the substrate as the ion beam for erasing.

It is also effective to utilize a compound substrate consisting of some elements not including element B instead of the element A substrate. It is to be desired that the electron reflection differs greatly or the radiation energy changes greatly between element B and the substrate element.

The variety of the ion source is increased by searching for the liquid metal ion source. Therefore, there are no basic constraints that element A and element B must be limited specific elements. The usable elements are Hg, Cs, Rb, Tl, Pb, Al, Ga, Li, Bi, In, Sn, Zn, Mg, Sb, As, Be, Pd, B, Ni, Cu, Si, Pt, Ge, K, Na and U. Among these elements, each of those from Zn to Na should be in the form of alloy in the ion source so as to be in liquid phase.

However, in order to secure an enlarged S/N ratio, an element with a large Clark number may be utilized as the element for the substrate while an element with a small Clark number may be utilized as the element for the writing ion beam. For example, since the Clark numbers of Si and Ga are respectively 25.8 and $1 \times 10^{-3}$, Si may be used as element A for the substrate and Ga as element B for the writing ion beam.

For recording, it is not required by this invention that the element of ION source is directly deposited as it is. Alternatively, it may be also possible that gas molecules absorbed on the surface of the substrate are decomposed by ion beam irradiation so that volatile components evaporate while unvolatile dissociative atoms deposited on the surface to form a thin-film pattern. For example, if the substrate is irradiated by a 35 KeV Ga+ ion at room temperature under trimethyl aluminum atmosphere of approx. 20 m torr, Al can be deposited on the substrate.

If the ion source is Ga+, then Ga+ is utilized as element C for erasing, and Al is used as element B for recording.

If the ion source is an alloy including both element B for recording and element C for erasing, then substrate 1 is irradiated by selecting element B for recording and element C for erasing by the mass filter 33. Element A and element C may be same. That is, selection of ions irradiating the substrate by the mass filter 33 allows the distinction between recording and erasing.

When an information signal is sent to a pattern generator 39, a detector controller 40 and a stage controller 41, a position to be irradiated is selected by the pattern generator 39 and stage controller 41, resulting in the movement of stage 37 and the adjustment of voltage applied to the deflection plate 35. A recording or erasing operation is enabled by controlling the blanking plate 32.

The information recorded in the form of a difference of the kinds of elements can be read by utilizing the difference by irradiation of an electron beam. If a pattern formed by an element different from the element of the substrate is scanned by converging the aperture of an electron beam to be a detecting probe, its secondary electron intensity or reflected electron intensity reflects the difference between the two elements. The diameter of an electron beam can be focused to 50 nm, so its spot is smaller than that of the site of information, resulting in good detecting ability, or high resolution.

The first reading method is to detect the Auger electron which is produced by irradiating a focused electron beam.

The second reading method utilizes the Z-contrast in which the secondary electron intensity and scattering intensity of an irradiating focused electron beam depend on the atomic number of an element.

Figure 4:
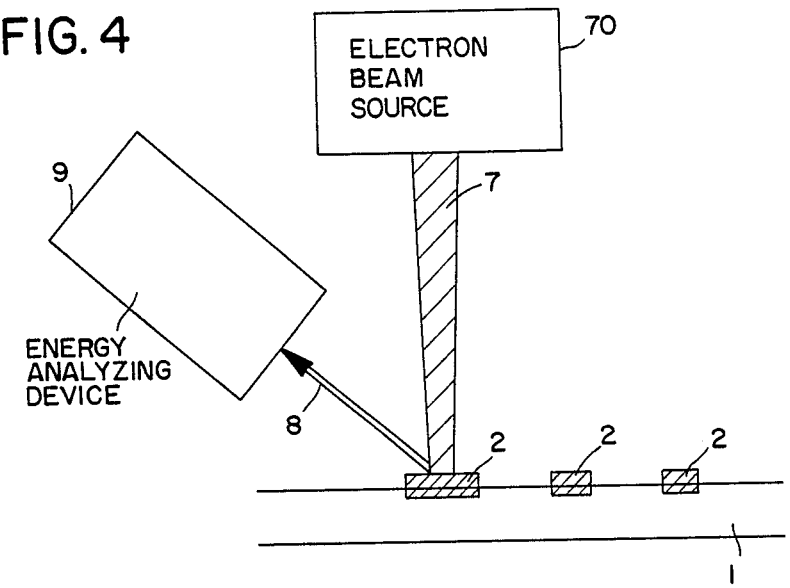
FIG. 4 depicts a principle of reading by detecting Auger electrons.

FIG. 4 shows the principle of the first reading method. Reference numeral 2 shows atomic layers or implantation layers of an element B for recording, and 1 is a substrate which consists of a compound C not containing element B or consists of an element A different from B. Scanning with an electron beam 7 emitted from an electron beam source 70 on such recorded substrate causes generation of Auger electrons 8 of elements A, B (or components of compound C) jumping out of the surface of the substrate 1. Consequently, detection of the presence of Auger electrons from element B by using an energy analyzing device 9 shows the presence of element B on the electron beam focused point.

Since the energy of Auger electron is peculiar to an atom depending on the atom's inner core level, the atom can be identified. If for example element A of the substrate is Si and recording element B is Ga, main energies of Auger electron from the Auger spectrum are as follows:

Si: 89 eV, 1616 eV
Ga: 53 eV, 971 eV, 1066 eV

In this case, driving of a detecting device near 53 eV enables only the Auger electrons of Ga to be picked up. Since the Auger electrons of Si have the smallest energy at 89 eV, an adequately high S/N ratio can be obtained.

It is preferable to drive the detecting device so that the difference of the detected energy of Auger electron of element B from those of Auger electron of the substrate element is as large as possible or to select the element B and the substrate element so that the difference between energies of Auger electrons thereof is as large as possible. In spite of the fact that the recorded state is completely digitized bit train or graphic pattern, this method has no restriction.

The second reading method utilizes the fact that, when irradiating a focused electron beam, the intensity of secondary electron depends on the atomic number of element.

Figure 5:
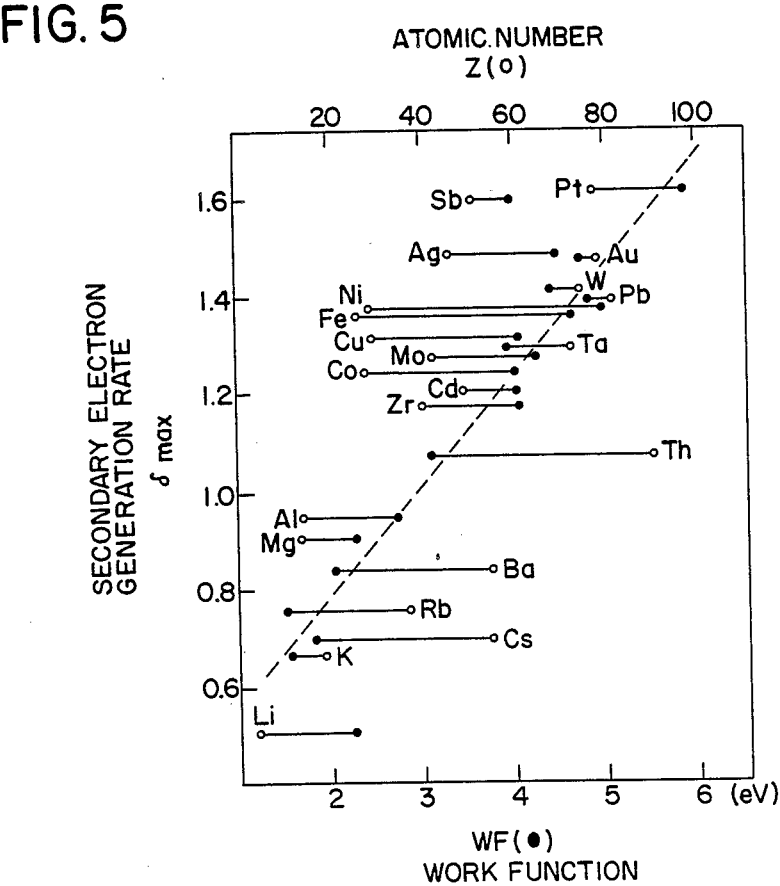
FIG. 5 depicts effect of atomic number and work function on generation rate of secondary electrons.

In FIG. 5, atomic number Z (the white circle O in the figure) is given on the upper horizontal-axis, secondary electron generation rate 8 is given as the vertical-axis, and work function WF (the black circle in the figure) is given on the lower horizontal-axis, for showing their relationships. FIG. 5 shows that the larger the atomic number of an element is, the more frequently the secondary electron is generated. Namely, when the substrate is scanned by a focused electron beam while measuring the secondary electron beam intensity, and if the substrate consists of an element with a smaller atomic number and the recorded element is an element with a larger atomic number, then the intensity from a recorded site is so large that the presence of the recorded site can be identified.

Figure 6:
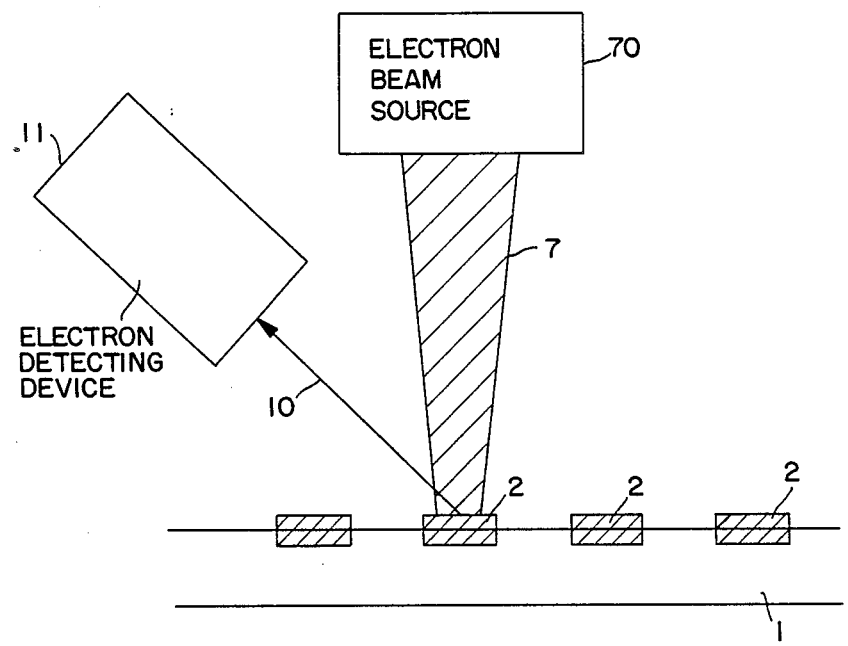
FIG. 6 depicts a principle of reading by detecting secondary electrons.

FIG. 6 shows a basic configuration according to this method. When the surface of the substrate 1 is scanned by a focused electron beam 7 emitted from the electron beam source 70, reflection scattering electrons and secondary electrons 10 are scattered from the surface of the substrate 1. These electrons are caught by an electron beam detecting device 11 which measures the intensity of the electrons. The stronger intensity of the reflection scattering electron beam and secondary electron beam shows the existence of the recording site 2 of element B.

As the third method, the substrate is scanned by a focused ion beam containing any element different from element B consisting the information recorded site, preferably same as that of the substrate, and the difference of intensities of the secondary electrons are detected. In this case, the electron beam source 70 shown in FIG. 6 may be replaced by an ion source.

The fourth method is such that the information recorded substrate is scanned by an electron beam, the characteristic X-rays from the substrate are picked up. In order to pick up the characteristic X-ray from the element B recorded site, a crystal for selecting wavelength is placed in front of a proportional counter of X-rays to control the direction of the characteristic X-ray. This method utilizes the principle of the electron probe X-ray micro analyzer.

Figure 7:
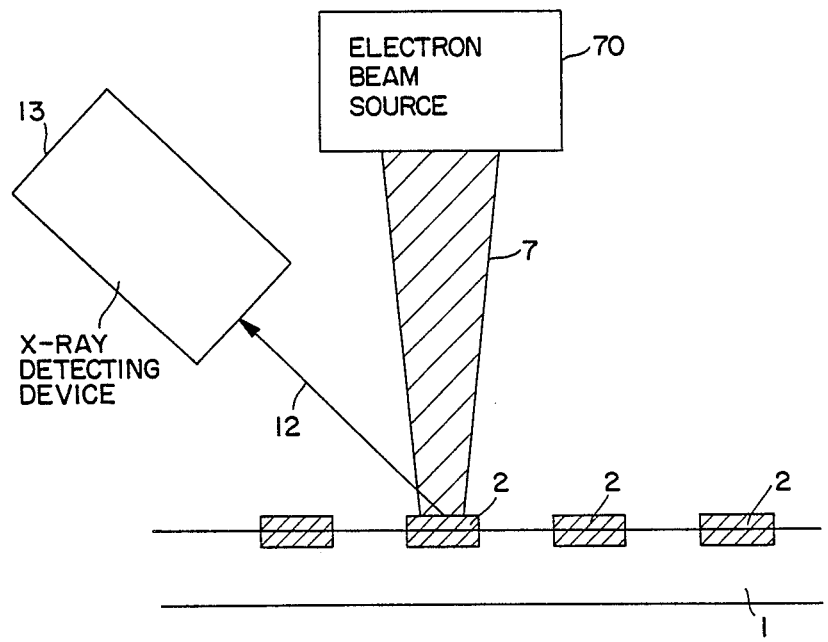
FIG. 7 depicts the principle of rading by detecting X-rays.

FIG. 7 shows a basic configuration according to such method. When the substrate 1 is scanned by a focused electron beam 7 emitted from the electron beam source 70, characteristic X-rays 12 are scattered from the surface of the substrate 1. These characteristic X-rays are caught by a characteristic x-ray detecting device 13 which measures the intensity of the characteristic X-rays shows the existence of the recording site 2 of element B.

What is claimed is:

1. A method of erasing information recorded on a substrate by the presence or absence of a deposited specific element on said substrate, comprising sputtering the deposited specific element from the substrate by an ion beam irradiation of an element on said substrate.

2. A method of erasing information recorded on a substrate by the presence or absence of an implanted specific element on said substrate, comprising sputtering the implanted specific element from the substrate by an ion beam irradiation of an element on said substrate.

3. A method as claimed in claim 1 or 2 wherein the element of the ion beam irradiation is different from the specific element.

4. A method of reading information recorded on a substrate comprising an element A by the presence or absence, on said substrate, of a deposited element B which is different from element A, comprising scanningly applying a focused electron beam to the substrate and detecting one of Auger electrons, reflecting electrons, secondary electrons and characteristic X-rays generated at the deposited element B by the focused electron beam application.

5. A method of reading information recorded on a substrate comprising an element A by the presence or absence, on said substrate, of a deposited element B which is different from element A, comprising scanningly applying a focused ion beam to the substrate, and detecting one of Auger electrons, reflecting electrons, secondary electrons and characteristic X-rays generated at the deposited element B by the focused ion beam application.

6. A method of reading information recorded on a substrate comprising an element A by the presence or absence, on said substrate, of an implanted element B which is different from element A comprising scanningly applying a focused electron beam to the substrate and detecting one of Auger electrons, reflecting electrons, secondary electrons and characteristic X-rays generated at the implanted element B by the focused electron beam application.

7. A method of reading information recorded on a substrate comprising an element A by the presence or absence on said substrate, of an implanted element B which is different from element A, comprising scanningly applying a focused ion beam to the substrate and detecting one of Auger electrons, reflecting electrons, secondary electrons and characteristic X-rays generated at the implanted element B by the focused ion beam application.

8. A method of writing and reading information comprising the steps of:
   depositing on a substrate a specific element by an ion beam irradiation thereof according to an information signal, wherein the information is written on a substrate by the presence or absence of the specific element on the substrate;
   scanningly applying a foxed electron beam to the substrate; and
   detecting one of Auger electrons, reflecting electrons, secondary electrons and characteristic X-rays generated at the deposited specific element by the focused electron beam application.

9. The method as claimed in claim 3 wherein the specific element is different from any element contained in the substrate.

10. A method of writing and reading information, comprising the steps of:
   implanting in a substrate a specific element by an ion beam irradiation thereof according to an information signal, wherein the information is written on a substrate by the presence or absence of the specific element on the substrate;
   scanningly applying a focused electron beam to the substrate; and
   detecting one of Auger electrons, reflecting electrons, secondary electrons and characteristic X-rays generated at the implanted specific element by the focused electron beam application.

11. The method as claimed in claim 10 wherein the specific element is different from any element contained in the substrate.

12. The method as claimed in any one of claims 8, 10, 9 or 11, wherein the ion beam is a focused ion beam which is deflected and blanked according to the information signal.

13. The method as claimed in any one of claims 2, 10, 9 or 11 wherein the detecting step detects a difference between energy levels of the generated Auger electrons from the part where the specific element exists and from the part where the specific element does not exist.

14. The method as claimed in any one of claims 8, 10, 9 or 11 wherein the Clark number of the specific number is smaller than that of the element contained in the substrate.

15. The method as claimed in any one of claims 8, 10, 9 or 11 wherein each of the specific elements and the element contained in the substrate is an element selected from the group consisting of Hg, Cs, Rb, Tl, Pb, Al, Ga, Li, Bi, In, Sn, Zn, Mg, Sb, As, Be, Pd, B, Ni, Cu, Si, Pt, Ge, K, Na and U.

* * * * *